(12) United States Patent
Pruetz

(10) Patent No.: US 8,408,059 B2
(45) Date of Patent: Apr. 2, 2013

(54) YAW RATE SENSOR AND METHOD FOR OPERATING A YAW RATE SENSOR

(75) Inventor: Odd-Axel Pruetz, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 329 days.

(21) Appl. No.: 12/857,758

(22) Filed: Aug. 17, 2010

(65) Prior Publication Data

US 2011/0041603 A1 Feb. 24, 2011

(30) Foreign Application Priority Data

Aug. 18, 2009 (DE) .......................... 10 2009 028 623

(51) Int. Cl.
  *G01C 19/56* (2006.01)
(52) U.S. Cl. .................................. 73/504.12; 73/504.04
(58) Field of Classification Search ................ 73/504.12, 73/504.14, 504.04, 504.16, 504.02
   See application file for complete search history.

(56) References Cited

U.S. PATENT DOCUMENTS

| | | | |
|---|---|---|---|
| 7,316,161 B2 * | 1/2008 | Willig et al. ................ | 73/504.12 |
| 7,950,281 B2 * | 5/2011 | Hammerschmidt ....... | 73/504.04 |
| 8,176,780 B2 * | 5/2012 | Takagi et al. .............. | 73/504.14 |
| 2011/0126621 A1 * | 6/2011 | Neul .......................... | 73/504.12 |

FOREIGN PATENT DOCUMENTS

WO 03/058167 7/2003

* cited by examiner

*Primary Examiner* — Helen C. Kwok
(74) *Attorney, Agent, or Firm* — Kenyon & Kenyon LLP

(57) ABSTRACT

A yaw rate sensor is described which includes a substrate having a main plane of extension and a Coriolis element, the Coriolis element being excitable to a driving oscillation along a first direction parallel to the main plane of extension, using a driving arrangement, and a deflection of the Coriolis element along a second direction perpendicular to the first direction being detectable, and the yaw rate sensor having an interference element for exciting the Coriolis element to an interference oscillation.

14 Claims, 3 Drawing Sheets

US 8,408,059 B2

YAW RATE SENSOR AND METHOD FOR OPERATING A YAW RATE SENSOR

RELATED APPLICATION INFORMATION

The present application claims priority to and the benefit of German patent application no. 10 2009 028 623.3, which was filed in Germany on Aug. 18, 2009, the disclosure of which is incorporated herein by reference.

FIELD OF THE INVENTION

The present invention is directed to a yaw rate sensor.

BACKGROUND INFORMATION

Yaw rate sensors of are believed to be generally understood. For example, a yaw rate sensor is discussed in International patent publication WO 03/058 167 A1, which includes a substrate and two Coriolis elements, the Coriolis elements being excitable to antiparallel oscillations parallel to the substrate along a first axis X so that, in the presence of a yaw rate perpendicular to the substrate along a third direction Z, antiparallel deflections of the Coriolis elements, which are detectable for determining the yaw rate, are generated along a second direction Y perpendicular to both the first direction X and the third direction Z, and the yaw rate sensor having a force-applying arrangement between the substrate and the Coriolis elements in the form of compensation structures, the compensation structures including a plurality of cutouts of an asymmetrical design in the Coriolis element and including compensation electrodes which engage with the cutouts and are fixedly connected to the substrate. The compensation structures are provided to compensate a 1f quadrature interference signal which is generated by manufacturing-related imperfections in the sensor structure and which result in modulation of the detection signals at the driving frequency and thus result in unwanted offset signals in the detection branch. The 1f quadrature interference signal thus has the same frequency as the oscillation. Furthermore, there is a 2f quadrature interference signal whose frequency is double the frequency of the oscillation and may result in overload in the detection branch. Methods are known for suppressing the 2f quadrature interference signal by suitably dimensioning a coupling spring between the two Coriolis elements. The quadrature is disadvantageously changed by external influences (for example, by temperature changes or substrate bending due to package stress), while the dimensioning of the coupling spring is not adjustable later, in particular during operation of the yaw rate sensor. Consequently, it is not practical to modify the 2f quadrature interference signal by suitably dimensioning the coupling spring. Moreover, a complete suppression of the 2f quadrature interference signal results in the yaw rate sensor having too low a basic modulation amplitude, which impairs the functionality of the yaw rate sensor, in particular at low yaw rates.

SUMMARY OF THE INVENTION

The yaw rate sensor according to the exemplary embodiments and/or exemplary methods of the present invention and the method according to the present invention for operating a yaw rate sensor according to the independent claims have the advantage over the related art that an active excitation of the 2f quadrature interference signal is made possible. The magnitude of the 2f quadrature interference signal may, in particular, be advantageously variably set and adjusted, so that the yaw rate sensor may be continuously optimized with regard to its modulation amplitude independently of external influences or manufacturing-related imperfections. In particular, it is thus possible to set a sufficiently high basic modulation amplitude without the danger of overload. This is achieved by the fact that the yaw rate sensor according to the present invention, in contrast to the related art, has an interference element which is provided to actively excite the Coriolis element to interference oscillation, so that, in particular, an active excitation of the 2f quadrature interference signal is achieved.

Advantageous embodiments and refinements of the exemplary embodiments and/or exemplary methods of the present invention are provided in the subordinate claims as well as in the description, with reference to the drawings.

According to a specific embodiment, it is provided that the interference element has a fixed electrode connected to the substrate which is situated in a recess of the Coriolis element parallel to the main plane of extension. The interference oscillation is thus advantageously excitable by a direct electrostatic interaction between the Coriolis element and the fixed electrode, it being possible to easily set the magnitude of the interference oscillation, i.e., in particular the amplitude of the interference oscillation, by applying an appropriate potential difference between the fixed electrode and the Coriolis element.

According to a specific embodiment, it is provided that the recess has a C-shaped design on the main plane of extension. In the sense of the exemplary embodiments and/or exemplary methods of the present invention, a C-shaped configuration means that a projection of the Coriolis element extends into the recess, which may be parallel to the second direction, the projection being situated along the first direction, in particular which may be essentially in the middle of the recess. Due to the projection, two legs of the recess, which may extend parallel to second direction Y and perpendicular to the driving oscillation, are separated from each other along the first direction. The C-shaped recess has the advantage that an excitation of the interference oscillation having twice the frequency of the driving oscillation is generated only by applying a direct voltage between the fixed electrode and the Coriolis element, since the fixed electrode passes by the projection between the legs of the recess twice during each excitation period and thus generates an excitation force parallel to the driving oscillation, in particular parallel to the first direction X, having twice the frequency of the driving oscillation for exciting the interference oscillation, in particular the 2f quadrature interference signal. It is, of course, clear to those skilled in the art that a symmetrical design of the recess may also be achieved relative to the second direction as an alternative, an alternating current having twice the frequency of the driving oscillation being applied in this case between the fixed electrode and the Coriolis element.

According to a specific embodiment, it is provided that the interference oscillation has a frequency which is essentially twice the frequency of the driving oscillation, and/or it is provided that the interference oscillation is parallel to the driving oscillation. A 2f quadrature interference signal is thus advantageously excited, so that the modulation amplitude of the yaw rate sensor may be optimally adjusted.

According to a specific embodiment, it is provided that the yaw rate sensor includes compensation elements for exciting compensation forces, the compensation elements including, in particular, compensation electrodes connected to the substrate, each of which is situated in compensation recesses of the Coriolis element on the main plane of extension, the compensation recesses may have an L-shaped and/or S-shaped design, and the compensation forces may have a frequency which is essentially equal to the frequency of the driving oscillation. A compensation of the 1f quadrature interference signal is thus advantageously achieved, whereby an offset is suppressed in the detection branch and this compensation is not needed for setting the modulation amplitude of the yaw rate sensor.

According to a specific embodiment, it is provided that the yaw rate sensor has a further Coriolis element which is essentially structurally equivalent to the Coriolis element and is coupled to the Coriolis element via an elastic element, the further Coriolis element being excitable to a further driving oscillation antiparallel to the driving oscillation by a further driving arrangement, and a further deflection of the further Coriolis element antiparallel to the deflection being detectable, the yaw rate sensor having a further interference element for exciting a further interference oscillation, the further interference element having, in particular, a further fixed electrode connected to the substrate which is situated in a further recess of the further Coriolis element parallel to the main plane of extension. A differential yaw rate sensor is thus advantageously provided which permits a differential and thus more accurate evaluation of the yaw rate. While the further Coriolis element is structurally equivalent to the Coriolis element, it has a mirrored design with regard to a plane of symmetry running through the middle of the yaw raw sensor along first direction X and a third direction Z perpendicular to both first and second directions X, Y, the further Coriolis element may include further compensation elements for exciting further compensation forces, the further compensation elements including, in particular, further compensation electrodes connected to the substrate, each of which is situated in further compensation recesses of the further Coriolis element on the main plane of extension, the further compensation recesses may have an L-shaped and/or S-shaped design, and the further compensation forces may have a frequency which is essentially equal to the frequency of the driving oscillation. In the further Coriolis element, a compensation of the 1f quadrature interference signal is thus also advantageously achieved.

According to a specific embodiment, it is provided that the further recess has a C-shaped design on the main plane of extension, the recess and the further recess may be situated mirror-symmetrically to each other with regard to the elastic element, so that advantageously no resulting unwanted interference oscillations are excited by the interference element and the further interference element parallel to second direction Y, since the particular components compensate each other along second direction Y, and only one interference oscillation, i.e., the 2f quadrature interference signal, is thus generated along first direction X.

A further subject matter of the exemplary embodiments and/or exemplary methods of the present invention is a method for operating a yaw rate sensor, the first Coriolis element being excited to driving oscillation by the driving arrangement, and the interference oscillation of the Coriolis element being excited by the interference element at a frequency which is, in particular, essentially twice the frequency of the driving oscillation. Compared to the related art, the method according to the present invention advantageously permits a selective setting of the yaw rate sensor modulation amplitude, by selectively generating a 2f quadrature interference signal. According to a specific embodiment, it is provided that the compensation elements are used to produce compensation forces on the first Coriolis element at a frequency which essentially corresponds to the frequency of the driving oscillation, so that the 1f quadrature interference signal is advantageously suppressed.

According to a specific embodiment, it is provided that the compensation elements are used to suppress a 1f quadrature interference signal, while the interference element is used to selectively generate a 2f quadrature interference signal, so that an offset in the detection branch generated by the 1f quadrature interference signal is advantageously suppressed, and the modulation amplitude of the yaw rate sensor may at the same time be selectively set and optimized using the 2f quadrature interference signal.

Exemplary embodiments of the present invention are illustrated in the drawings and explained in greater detail in the following description.

DETAILED DESCRIPTION

Figure 1A:
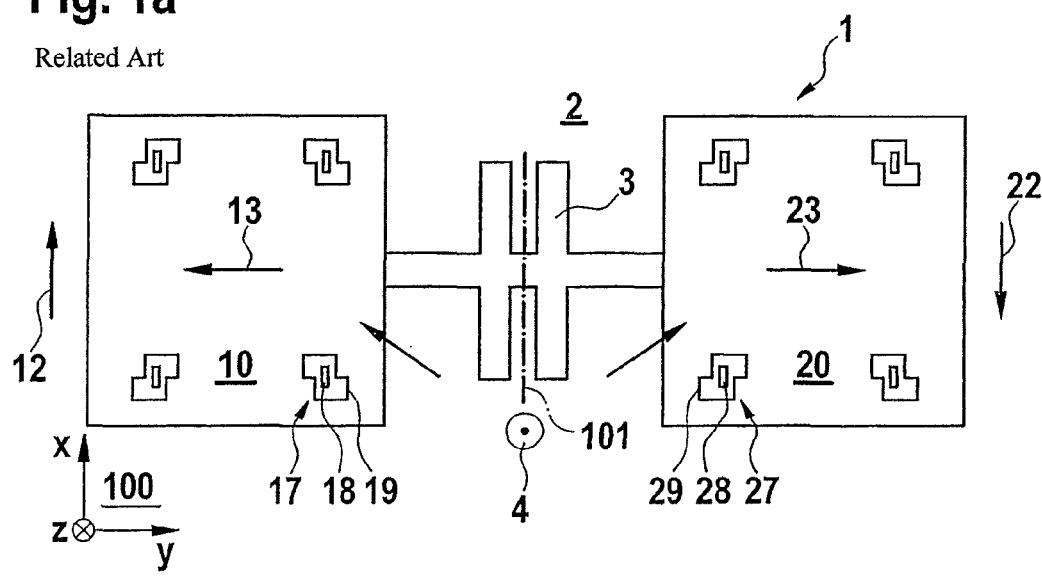
FIG. 1a shows a schematic top view of a yaw rate sensor according to the related art.

FIG. 1a shows a schematic top view of a yaw rate sensor 1 according to the related art, yaw rate sensor 1 including a Coriolis element 10 and a further Coriolis element 20, which are coupled to each other by an elastic element 4. Coriolis element 10 is excited to a driving oscillation 12 parallel to a first direction X by a driving arrangement (not illustrated), first direction X running parallel to a main plane of extension 100 of a substrate 2. Further Coriolis element 20 is driven to a further driving oscillation 22, which is antiparallel to driving oscillation 12, using a further driving arrangement (not illustrated). In the presence of a yaw rate 4 around a rotation axis parallel to a third direction Z, third direction Z being perpendicular to first direction X and perpendicular to main plane of extension 100, a Coriolis force acts upon Coriolis element 10 along second direction Y, which is perpendicular to first and third directions X, Y, so that Coriolis element 10 undergoes a deflection 13 parallel to second direction Y. Further Coriolis element 20 undergoes a further antiparallel deflection parallel to second direction Y in a manner similar to deflection 13. Deflection 13 and further deflection 23 are detectable using a detection arrangement, which are not illustrated, the difference between the corresponding detection signals being a measure of the yaw rate. Yaw rate sensor 1 includes four compensation elements 17 and four further compensation elements 27 by way of example, compensation elements 17 each having a compensation recess 19 in Coriolis element 10 and a longitudinal compensation electrode 18, which is fixedly connected to substrate 2 and which engages with compensation recess 19 along third direction Z. Compensation recesses 19 each have an S-shaped (or alternatively L-shaped) design. Similarly, further compensation elements 27 are provided in the area of further Coriolis element 20. Compensation elements 17 and further compensation elements 27 are provided for the purpose of producing a compensation force 30 between substrate 2 and Coriolis element 10 or between substrate 2 and further Coriolis element 20, the compensation force acting against and thus compensating or suppressing a 1f quadrature interference signal. Coriolis element 10 and further Coriolis element 20 include optional driving frames and/or detecting elements, each of which is connected by the seismic mass only via coupling springs. A plurality of four such compensation elements and further compensation elements is also conceivable.

Figure 1B:
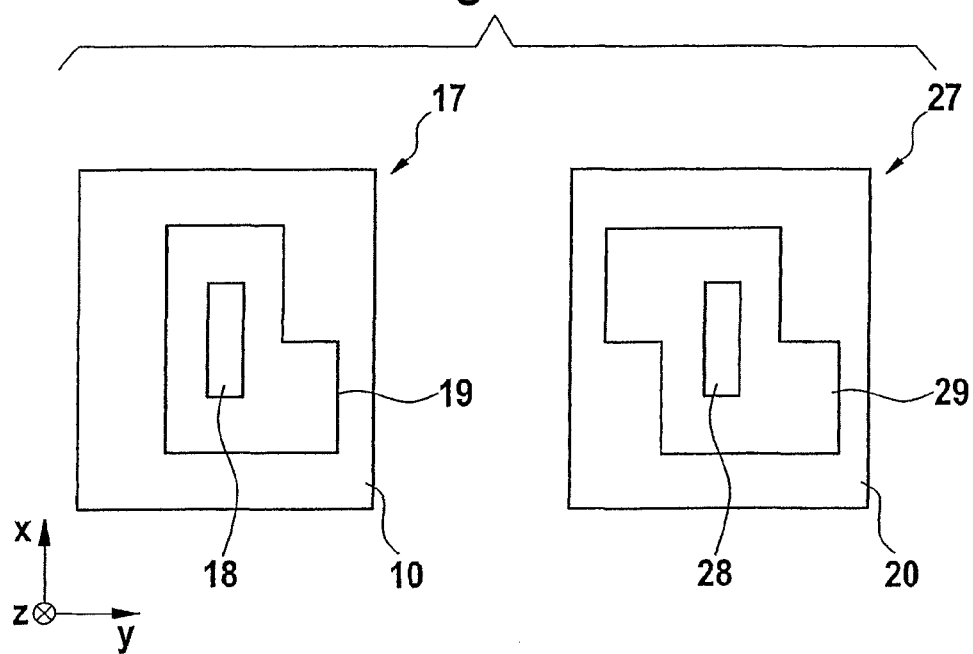
FIG. 1b shows a schematic top view of compensation structures of a yaw rate sensor according to the related art.

FIG. 1b shows a schematic top view of compensation structures 17 of a yaw rate sensor 1 according to the related art, yaw rate sensor 1 being essentially identical to yaw rate sensor 1 illustrated in FIG. 1a, with the difference that compensation recesses 19 are L-shaped and not S-shaped.

Figure 1C:
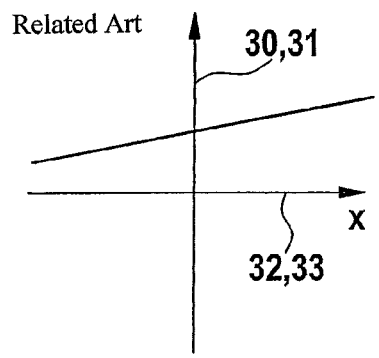
FIG. 1c shows a schematic curve of the compensation forces in yaw rate sensors according to the related art.
Figure 1D:
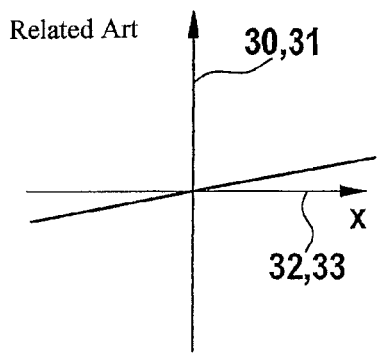
FIG. 1d shows a schematic curve of the compensation forces in yaw rate sensors according to the related art.

FIGS. 1c and 1d each show a schematic curve of compensation forces 30 of yaw rate sensor 1 according to the related art, compensation force 30 being plotted in each case on ordinate 31 and deflection movement 33 of Coriolis element 10 along first direction X during driving oscillation 12 being plotted on abscissa 32. FIG. 1c shows the compensation force of yaw rate sensor 1 illustrated in FIG. 1b, and FIG. 1d shows the compensation force of yaw rate sensor 1 illustrated in FIG. 1a, the shift along ordinate 31 being generated by the different shapes of compensation recesses 19.

Figure 2A:
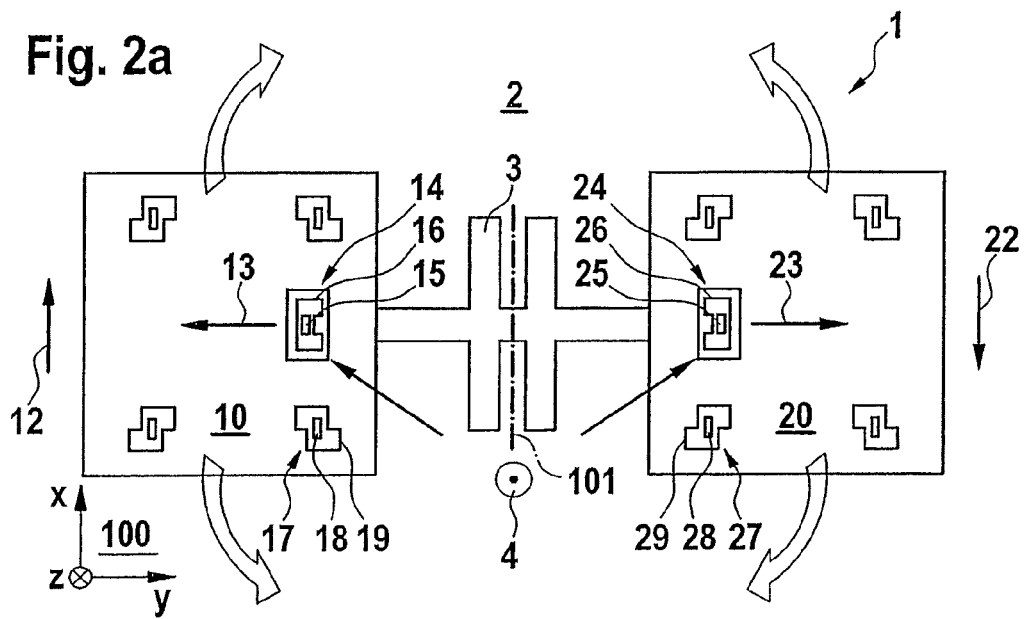
FIG. 2a shows a schematic top view of a yaw rate sensor according to an exemplary specific embodiment of the present invention.
Figure 2B:
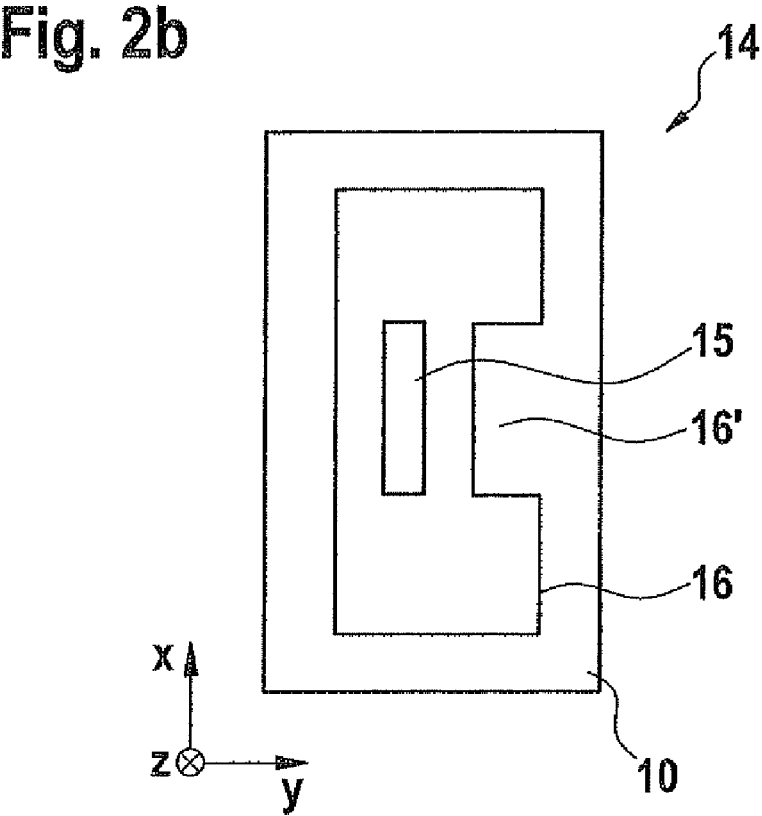
FIG. 2b shows a schematic top view of an interference element of a yaw rate sensor according to an exemplary specific embodiment of the present invention.

FIGS. 2a and 2b show a schematic top view and a schematic partial view of a yaw rate sensor 1 according to an exemplary embodiment of the present invention, yaw rate sensor 1 essentially resembling yaw rate sensor 1 illustrated in FIG. 1a, yaw rate sensor 1 according to the exemplary embodiment of the present invention additionally having two interference elements 14, 24 for exciting Coriolis element 10 and further Coriolis element 20 to an interference oscillation 14 in each case. Interference element 14 includes a recess 16 in Coriolis element 10, with which a fixed electrode 15, which is longitudinally provided along first direction X, and is fixedly connected to substrate 2 engages. Recess 16 has a C-shaped design, producing a projection 16' of Coriolis element 10 which extends along second direction Y in the direction of fixed electrode 15 and which is situated centrally in relation to recess 16 along first direction X. Similarly, further Coriolis element 20 has a further recess 26, in which a further fixed electrode 25 is situated. Further recess 26 is provided with a mirror-image design relative to recess 16 in relation to a plane of symmetry 101 running through the middle of yaw rate sensor 1 along first direction X and third direction Z. FIG. 2b shows a schematic partial view of yaw rate sensor 1, which only illustrates an enlarged view of interference element 14. A direct voltage is then applied between fixed electrode 16 and Coriolis element 10. Driving oscillation 12 of Coriolis element 10 causes fixed electrode 16 to pass by projection 16' twice during each oscillation period, and an interference oscillation of Coriolis element 10 is thus excited parallel to first direction X having twice the frequency of driving oscillation 12. This interference oscillation thus includes a 2f quadrature interference signal, which may be adjusted in any manner by selecting the direct voltage.

Figure 2C:
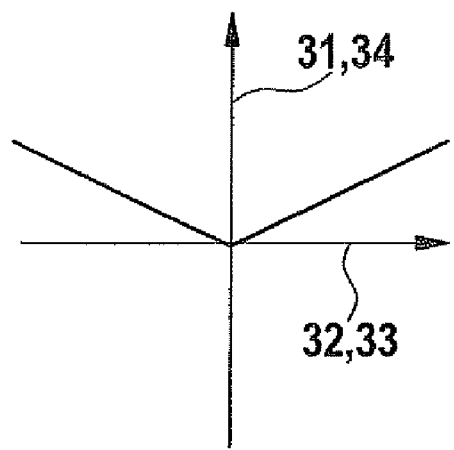
FIG. 2c shows a schematic curve of the interference forces in a yaw rate sensor according to the exemplary specific embodiment of the present invention.

FIG. 2c shows a schematic curve of interference forces 34 excited by interference elements 16, i.e., the 2f quadrature interference signal in yaw rate sensor 1 according to the exemplary specific embodiment of the present invention.

What is claimed is:

1. A yaw rate sensor, comprising:
a substrate having a main plane of extension;
a Coriolis element, which is excitable to a driving oscillation along a first direction parallel to the main plane of extension, using a driving arrangement;
wherein a deflection of the Coriolis element along a second direction, which is perpendicular to the first direction, is detectable, and
wherein the yaw rate sensor has an interference element for exciting the Coriolis element to an interference oscillation.

2. The yaw rate sensor of claim 1, wherein the interference element has a fixed electrode connected to the substrate, and wherein the fixed electrode is situated in a recess of the Coriolis element parallel to the main plane of extension.

3. The yaw rate sensor of claim 2, wherein the recess has a C-shaped configuration on the main plane of extension.

4. The yaw rate sensor of claim 1, wherein at least one of the following is satisfied: (i) the interference oscillation has a frequency which is essentially twice a frequency of the driving oscillation, and (ii) the interference oscillation is parallel to the driving oscillation.

5. The yaw rate sensor of claim 1, wherein the yaw rate sensor includes compensation elements for exciting compensation forces, wherein the compensation elements includes compensation electrodes connected to the substrate, each of which is situated in compensation recesses of the Coriolis element on the main plane of extension, and wherein the compensation recesses have at least one of an L-shaped configuration and a S-shaped configuration.

6. The yaw rate sensor of claim 1, wherein the yaw rate sensor has a further Coriolis element, which is essentially structurally equivalent to the Coriolis element and is coupled to the Coriolis element via an elastic element, wherein the further Coriolis element is excitable to a further driving oscillation anti-parallel to the driving oscillation, using a further driving arrangement, and wherein a further deflection of the further Coriolis element antiparallel to the deflection is detectable.

7. A method for operating a yaw rate sensor, the method comprising:
exciting a first Coriolis element to a driving oscillation by a driving arrangement, wherein an interference element is used for exciting the Coriolis element to an interference oscillation at a frequency which is twice a frequency of the driving oscillation;
wherein the yaw rate sensor includes:
a substrate having a main plane of extension;
the Coriolis element, which is excitable to a driving oscillation along a first direction parallel to the main plane of extension, using the driving arrangement, wherein a deflection of the Coriolis element along a second direction, which is perpendicular to the first direction, is detectable; and
the interference element for exciting the Coriolis element to an interference oscillation.

8. The method of claim 7, wherein compensation elements are used to produce compensation forces on the first Coriolis element at a frequency which essentially corresponds to a frequency of the driving oscillation.

9. The method of claim 8, wherein the compensation elements are used to suppress a 1f quadrature interference signal, and while the interference element is used to selectively produce a 2f quadrature interference signal.

10. The yaw rate sensor of claim 5, wherein the compensation recesses have at least one of an L-shaped configuration and a S-shaped configuration.

11. The yaw rate sensor of claim 10, wherein the compensation forces have a frequency which is essentially equal to a frequency of the driving oscillation.

12. The yaw rate sensor of claim 5, wherein the compensation forces have a frequency which is essentially equal to a frequency of the driving oscillation.

13. The yaw rate sensor of claim 1, wherein the yaw rate sensor has a further Coriolis element, which is essentially structurally equivalent to the Coriolis element and is coupled to the Coriolis element via an elastic element, wherein the further Coriolis element is excitable to a further driving oscillation anti-parallel to the driving oscillation, using a further driving arrangement, and wherein a further deflection of the further Coriolis element antiparallel to the deflection is detectable, wherein the yaw rate sensor has a further interference element for exciting a further interference oscillation, wherein the further interference element has a further fixed electrode, which is connected to the substrate and which is situated in a further recess of the further Coriolis element parallel to the main plane of extension.

14. The yaw rate sensor of claim 13, wherein the further recess has a C-shaped configuration on the main plane of extension, wherein the recess and the further recess are situated mirror-symmetrically to each other with regard to the elastic element.

* * * * *